United States Patent Office 3,184,729
Patented May 18, 1965

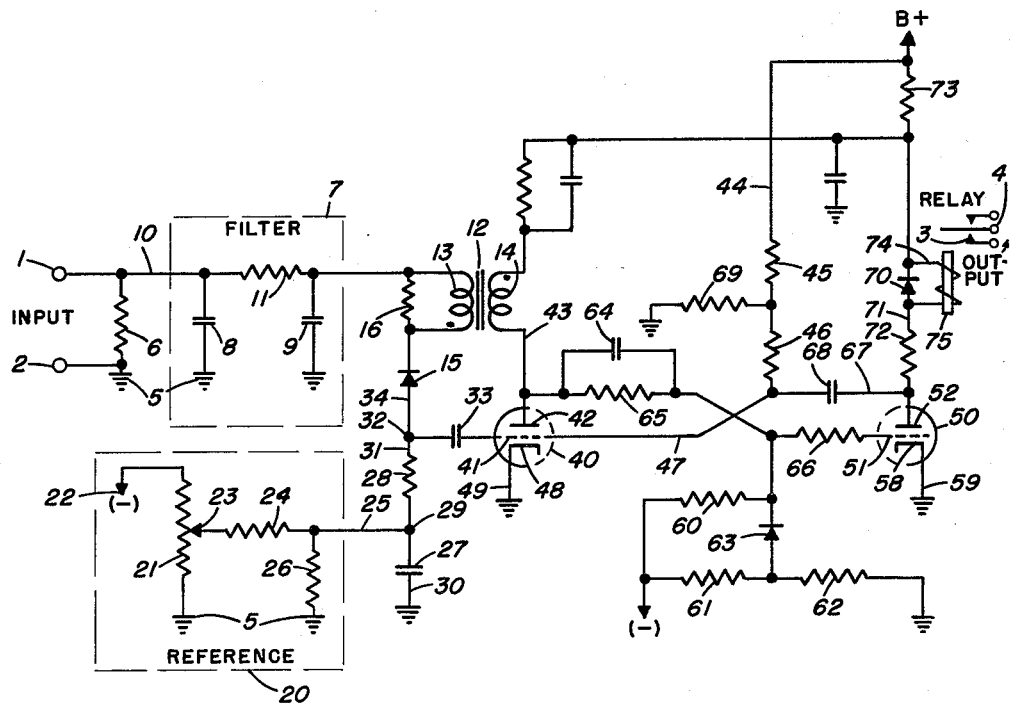

3,184,729
SIGNAL DEVIATION DETECTOR
David D. Freedman, Pennsauken, and William J. Hess, Medford, N.J., assignors, by mesne assignments, to the United States of America as represented by the Secretary of the Navy
Filed Jan. 26, 1962, Ser. No. 169,150
1 Claim. (Cl. 340—248)

This invention relates to a circuit for detecting a change in an electrical signal. More particularly this is a signal detector for indicating a deviation or change in potential in an electrical signal below a certain predetermined minimum value.

Electrical circuits of the type generally known as signal detectors are useful in a number of ways. For example they may be used to determine a rise or drop in potential and, in turn, signal this deviation to a related circuit which will either give a warning or switch in additional circuitry to compensate for the deviation. Such circuits usually detect either an instantaneous pulse or a slowly changing drop or deviation in potential. In many cases, it has been found unnecessary to detect the instantaneous signal changes since such changes do not always have adverse effects on the related circuitry. The detecting circuits can also be used to determine when there is no signal on the line such as when the power is shut off. The detection of a potential drop or no signal on the line are two closely related electrical characteristics since in both cases there would be a potential drop over an extended period of time. If a circuit can be adjusted to detect a predetermined minimum value, the same circuit will also detect a signal that drops far below this value such as a no signal condition.

Problems also arise in resetting these signal detectors when the condition is corrected. This resetting is easily done if there is a malfunction and the circuit is repaired but if the potential drop is for a time period of medium duration and the malfunctioning equipment corrects itself, the detector may still give an erroneous signal when the condition does not actually exist any longer. There may also be a need for calling attention to the detected error in the lines by a flashing light since a constantly burning red light may go unobserved if it is located in an instrument panel with a number of other red lights.

It is an object of this invention to provide an improved signal detecting circuit utilizing automatically resettable and adjustable circuitry for signaling a drop in potential along a line.

Another object of this invention is to provide an adjustable signal detector which has a flashing warning signal when a potential drop is detected.

Another object of this invention is to provide a simple inexpensive reliable signal detector for determining a drop in potential and for automatically resetting itself when the error signal is corrected.

Another object of this invention is to provide a signal detector with an adjustable reference means and a switching circuit for indicating the erroneous signal.

Another object of this invention is to provide an accurate signal level detector which will operate any electrical, magnetic, mechanical, optical, or chemical element to indicate an error signal.

Various other objects and advantages will appear from the following description of one embodiment of the invention, and the novel features will be particularly pointed out hereinafter in connection with the appended claim.

The illustrated embodiment of the signal detector has input terminals 1 and 2 and output terminals 3 and 4. Connected in shunt relationship between the input terminal 1 and the ground 5 is an input resistance 6 which serves to match the detector portion of the circuit to the signal line. This matching of circuits reduces the losses and improves the efficiency of the circuit. In series circuit relationship with the input terminal 1 is an integrating resistance-capacitance filter 7. The filter 7 is in a π type arrangement with two capacitors 8 and 9 in shunt between the input line 10 and ground 5 on either side of a resistance 11 which is connected in the input line 10. This input filter 7 is used to prevent noise pulses and spurious signals from operating the device, the capacitors 8 and 9 and resistor 11 being so related that the related time constant is fairly long. With this long time constant any sharp pulses will be attenuated and discharged over a long length of time and therefore will not effect the circuit. The winding 13 of a pulse transformer 12 is connected in series circuit relationship with the filter 7 at one end and connected to the junction of a diode 15 and a shunting resistor 16 at the other end.

An adjustable source of reference potential 20 is provided for predetermining the minimum voltage which the circuit will allow to go undetected. This source of reference potential 20 is in the form of a voltage divider which has a resistance 21 connected between a negative source of potential 22 and ground 5. In sliding contact with this resistance 21 is an adjustable tap 23 which can be adjusted from any potential from ground to the negative potential of the source 22. This reference source also includes a resistance 24 inserted in series relationship between the contact point 23 and the output line 25 of the reference source 20. A shunt resistance means 26 is connected between this output line 25 of the reference source 20 and ground 5. The series and shunt resistances 24 and 26 serve as a temperature compensating network. This network is warranted if the maximum reference voltage desired from reference source 20 is substantially below the negative potential 22.

The reference source output 25 is connected to the junction 29 of a capacitor 27 and a resistance 28, the capacitance 27 being connected to ground potential 5 at the end 30 and the resistance 28 being connected at the end 31 to the junction 32 of the diode and the grid capacitor 33. The diode 15 is oriented in such a direction that it will not conduct when the input signal is at a higher potential than the reference potential. But when the input potential drops below the reference potential the diode 15 will conduct and cause a flow of current along the line 34 and the junction 32 leading to the grid 41 of the tube 40.

The detector portion of the circuit is followed by a switching circuit such as a monostable multivibrator circuit. This multivibrator circuit is connected to the detector portion of the circuit by means of a coupling capacitor 33 connected to the grid 41 of the normally conducting tube 40 and a pulse transformer winding 14 connected to the plate 42 of the tube 40 by lead 43. The tube 40 is normally conducting because of the positive potential impressed on the grid 41 by the B+ source through line 44 the resistances 45 and 46 and line 47 to the grid 41. The second tube 50 of the multivibrator is kept at a non-conducting state because of a negative voltage impressed on the grid 51 by the voltage clamping means comprising the resistances 61 and 62 connected between the source of negative potential, ground, the diode 63 and the resistance 60. Since the cathodes 48 and 58 of the normally conducting and non-conducting tubes 40 and 50 respectively are kept at the ground potential by means of the lines 49 and 59, it can be seen that the positive potential on grid of one tube will cause conduction in that tube and the negative potential on the grid of the second tube will cause non-conduction in that tube.

As set out before, the voltage detecting portion of the circuit is connected to the multivibrator by means of a grid coupling capacitor 33 and a pulse transformer 12 in the plate circuit of the normally conducting tube 40. From the previous discussion it can be seen that the diode 15 is normally non-conducting when the input voltage is at a higher potential than the reference voltage level. But when the input voltage reaches a point lower than the reference voltage the reverse biased diode 15 then is in a conducting condition. While the reverse bias diode is non-conducting the pulse transformer winding 14 in the plate circuit cannot induce a regenerative signal in the windings 13 associated with the detector circuit. When the diode 15 becomes conducting due to the input condition the regenerative signal can be impressed on the windings in the detecting circuit. This regenerative signal will be caused by current flow which will be sent through the diode 15 and into the grid 41 through the coupling capacitor 33. This rise in negative potential at the grid 41 causes a cutting off of the tube 40 and an associated rise in the plate potential of this normally conducting tube 40. This rise in plate potential causes further feedback pulse to be sent through the pulse transformer 12 and back into the grid 41, therefore keeping the grid 41 at a negative potential. There is the capability of intermittently sending pulses on each complete oscillation of the multivibrator as long as the diode 15 remains conducting. This rise in potential of the plate 42 also causes the grid 51 potential in the normally non-conducting tube 50 to rise through the path formed by the parallel resistance 65 and capacitance 64 and the resistance 66. This rise in grid potential causes conduction in the normally non-conducting tube 50 and an associated drop in potential in the plate 52 of this tube 50. This drop in plate potential is impressed on the grid 41 of the normally conducting tube 40 over the line 67, through the capacitor 68 and line 47. This negative step in potential on grid 41 is initially at the same value or approximately at the same value as the step in plate potential of the normally non-conducting tube 50. But with a passage of time the capacitor 68 charges up at a time constant depending on the values of the capacitor 68 and the resistances 46, 45 and 69 leading to ground. When the charge across the capacitor 68 has reached the value sufficiently above cutoff on the grid 41 of the normally conducting tube 40, the tube will then conduct, causing a drop in potential in the plate 42 and an associated drop in the potential in the grid 51 and the parallel combination of the resistor 65 and the capacitor 64.

If the reversed biased diode 15 is still conducting due to the input signal being at a lower potential than the reference signal, the regenerative pulse signal will be fed back to the grid 41 in the form of a negative signal which will again cause a non-conducting condition in the normally conducting tube 40 because of the drop in potential in the grid 41. From this it can be seen that as long as the circuit fault condition or erroneous signal condition remains, the detecting portion of the circuit will continue shutting on and off the multivibrator associated with it.

Some means of signaling the operation of the multivibrator is desired. Since the first tube 40 is normally conducting, any signaling device placed in that circuit would tend to indicate when the circuit was operating; but since it is intended to indicate when the circuit is not functioning properly it is better to place the indicating device in the circuit of the normally non-conducting tube. The relay 74 is shown merely as an example of an indicating device operating when tube 50 goes into conduction. It is obvious that any suitable indicating, signalling or corrective device may be substituted for the relay 74 by one skilled in the art. Resistor 72 limits the plate 52 current flow while resistor 73 decouples the two circuits. Diode 70 acts as an arc suppressor. When plate 52 current ceases to flow due to tube 50 cutting off, abnormally high voltages would be built up by the inductance of relay coil 74. Since the relay is connected to the plate resistor 72 by lead 71, this high voltage from relay 74 could damage tube 50. Diode 70 prevents this by conducting the inductive current from relay 74 and thereby limiting the voltage buildup. Diode 70 does not conduct for normal plate current flow. When the detector operates, grid 51 rises in potential and tube 50 conducts current through plate 52 and the plate circuitry. This flow of current will cause the armature 75 of the relay 74 to operate the contact arm 4 of the contact 3 and an associated warning signal (not shown) which flashes on or off when the condition is not corrected. This relay 74 could also switch in other circuits to correct the condition which exists in the signal. If the condition is corrected the multivibrator will stop oscillating and the relay will not operate.

This versatile circuit arrangement can be adopted for many uses due to the fact that it can be adjusted for different reference potentials. This circuit also has inherent characteristics of being able to adjust the time constant of the switching action of the multivibrator. This lengthening or shortening of the time constant of the switching action or the switching period would cause a similar lengthening or shortening of the signaling action of the signal device such as the relay 74.

It will be understood that various changes in the details, materials, steps and arrangments of parts, which have been herein described and illustrated in order to explain the nature of the invention, may be made by those skilled in the art within the principle and scope of the invention as expressed in the appended claim.

What is claimed is:

A signal monitoring device comprising:

a pulse transformer having a primary and a secondary winding, each of said windings having first and second terminals, the signal to be monitored appearing at said first terminal of said primary winding;

an adjustable reference signal source;

a diode having an anode and a cathode, one of said anode and said cathode connected to said reference source, and the other of said anode and said cathode connected to said second terminal of said primary winding, said reference signal source providing an unblocking bias for said diode if the signal to be monitored is of lesser value than the reference signal source when said anode is connected to said reference source, and if the signal to be monitored is of greater value than the reference signal source when said cathode is connected to said reference source;

a plate-coupled monostable multivibrator, said multivibrator comprising a first and a second electron control valve, said first electron control valve having a grid-trigger terminal and a plate coupling feedback loop, said loop including said terminals of said secondary winding connected in series and including feedback from said first and said second control valves, and said grid-trigger terminal operatively connected to said one of said anode and said cathode of said diode, said first electron control valve being biased to normally conduct as a first stage of the multivibrator, said second electron control valve normally not conducting, and said second valve having an output electrode connected to an output load to be controlled by the flow of current through said output electrode to provide an indication of the relative magnitude of the monitored signal.

References Cited by the Examiner

UNITED STATES PATENTS

| | | | |
|---|---|---|---|
| 2,956,268 | 11/60 | Kline | 340—248 |
| 2,958,823 | 11/60 | Rabier | 340—248 XR |
| 2,982,887 | 5/61 | Seeley | 340—240 XR |
| 3,060,351 | 10/62 | Robbins et al. | 317—149.2 |
| 3,072,895 | 1/63 | Kaukman | 340—248 |

NEIL C. READ, *Primary Examiner.*